Nov. 27, 1928.　　　　　　　　　　　　　　　1,693,570
B. VALE
FISH CLEANING MACHINERY
Filed June 30, 1924　　　　2 Sheets-Sheet 1
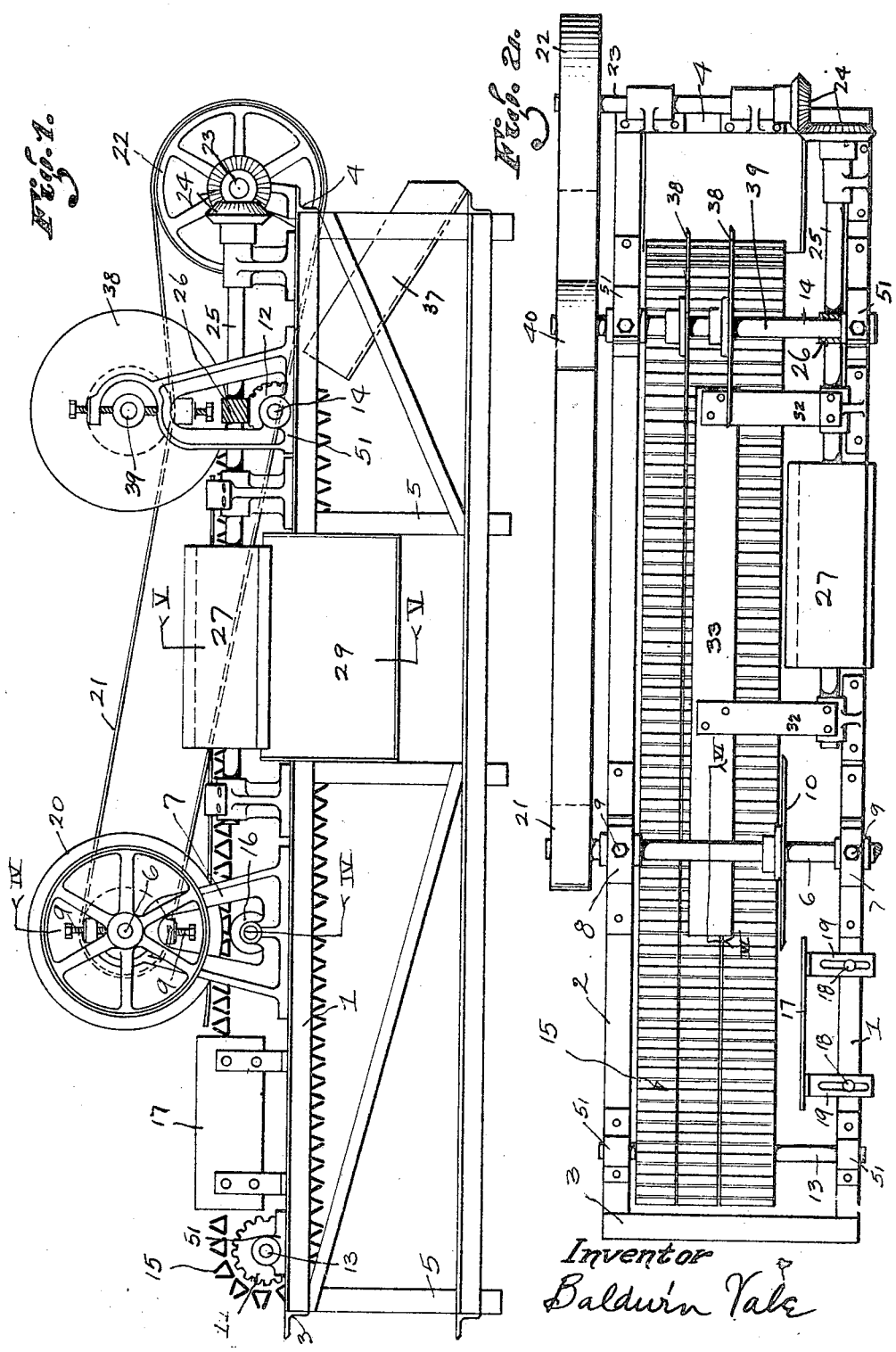
Inventor
Baldwin Vale Nov. 27, 1928.
B. VALE
1,693,570
FISH CLEANING MACHINERY
Filed June 30, 1924
2 Sheets-Sheet 2
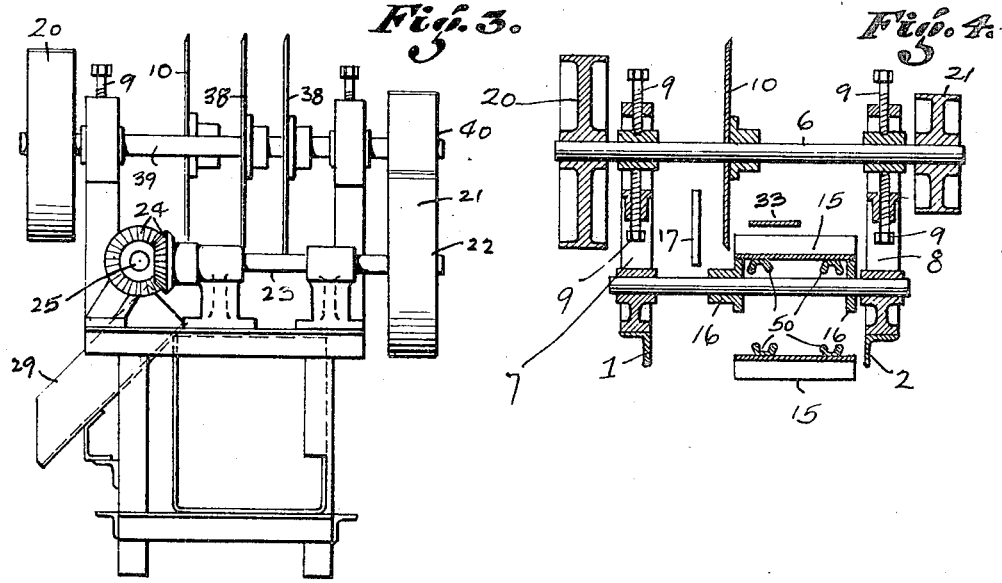
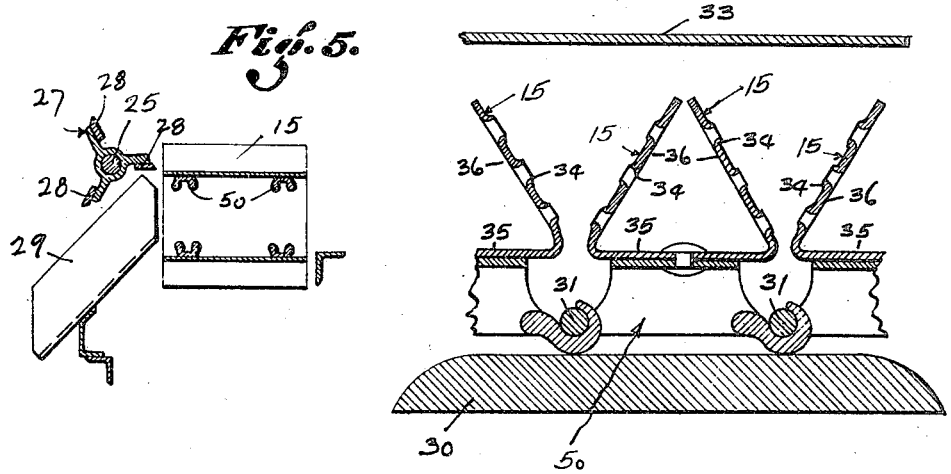
Inventor
Baldwin Vale Patented Nov. 27, 1928.

1,693,570

UNITED STATES PATENT OFFICE.

BALDWIN VALE, OF SAN FRANCISCO, CALIFORNIA, ASSIGNOR TO ROY L. DAILY, OF SAN FRANCISCO, CALIFORNIA.

FISH-CLEANING MACHINERY.

Application filed June 30, 1924. Serial No. 723,250.

This invention relates to improvements in fish cleaning machinery, and has for one of its objects, beheading the fish without completely severing the head from the viscera; whereby the fish is eviscerated at the same time the head is completely severed from the body.

Another object is to sever and divide the various parts of the fish so that the edible part is automatically separated from the "offal."

A further object is to provide means for dividing the edible portion of the fish body into several parts and distributing such severed parts according to their food, commercial or other values.

Generally speaking a fish may be divided into several portions having different commercial values. The head, viscera and tail portion are considered "offal" and are converted into fertilizer and the baser products. The center portion, behind the head for about one third the length of the body, is the most desirable portion and is available for various products for human consumption as food.

This invention provides means for separating these various portions with the minimum of waste and the maximum cleanliness in preparing the edible portion for canning, dehydration, dessication or other processing.

The invention has been illustrated and will be described herein in an embodiment particularly adapted to small fish of uniform size, such as sardines, herring and the like, but I do not wish to be understood as confining this invention to the limitations of the embodiment shown and described, because modification within the purview of this invention would adapt it to uses not specifically described herein.

In the accompanying two sheets of drawings—

Fig 1 is a side elevation of a machine, constructed in accordance with this invention.

Fig. 2 is a plan view from above the same.

Fig. 3 is an end view of the same.

Fig. 4 is a cross section taken through Fig. 1 on the line IV—IV.

Fig. 5 is a sectional view taken on the line V—V of Fig. 1.

Fig. 6 is an enlarged detail in longitudinal section taken on the line VI—VI of Fig. 2.

In detail the construction illustrated in the drawings comprises the main frame, preferably of angle iron having the side beams 1 and 2 joined at the ends by the beams 3 and 4, and supported on the legs 5. The whole frame being properly cross braced in accordance with mechanical practice.

The motive power is applied through the shaft 6, mounted in suitable bearings on the pillars 7 and 8 attached to the main frame. This shaft extends across the frame at about the center of its length. The bearings are vertically adjustable by means of the screw spindles 9—9, threaded in the pillars 7—8 and swiveled in the bearings; whereby the rotary cutting disc 10 fixed upon the shaft 6 may be raised and lowered.

A sectional linkbelt conveyor 50 is mounted upon sprockets 11 and 12 respectively fixed upon the shafts 13 and 14, mounted in bearings 51 on the main frame, the bearings 51 being adjustable to take up slack in said conveyor. Each link section in this conveyor is provided with a transverse clamping jaw 15, adapted to cooperate with the succeeding similarly equipped section to act as a positive clamp to securely hold the body of the fish placed therein belly down. The heads of the fish project beyond the ends of the jaw clamps, with all the heads pointing in one direction.

The rotary cutter 10, see Figs. 1 and 4, operates vertically at the edge of the conveyor, to sever the projecting heads of the fish from the backbone or spine down into the gills, without entirely separating the heads from the bodies. By means of the adjusting screws 9—9 the cutter can be regulated to cut down to the gullet, so as to leave the viscera still attached to the fish heads. Immediately under the cutter the conveyor is supported upon the transverse roller 16, to accurately maintain the depth of the cut of the rotary cutter 10.

Such fish as described are uniform in length and are placed in the conveyor between the clamping jaws 15—15, by hand, belly down, with the heads against the gage board 17, that is adjustably fixed to the main frame by the bolts 18, projecting through the slots in the brackets 19.

Power is applied to the machine through the pulley 20, fixed upon the end of the shaft 6 to drive the rotary cutter 10. The pulley 21 is fixed upon the opposite end of the shaft and is belted to the reduction pulley 22, on the countershaft 23, journaled in bearings on the end of the main frame. The miter gearing 24, transmits power to the jack shaft 25, suitably mounted upon a sidebeam of the frame.

The spiral gearing 26, drives the shaft 14 of the conveyor, the horizontal multiple cutter head 27, see Fig. 5, is fixed upon the shaft 25, beyond the position of the disc cutter 10. This cutter head is provided with a plurality of cutting or pulling blades 28, adapted to engage the partially severed heads of the fish bodies and complete the severance of the heads therefrom by engaging the bony structure of the spine and head and tearing it loose from the gills at the same time withdrawing the viscera that is attached to the body only at the anal cavity to any resisting extent; thus leaving the fish body free of "offal" and ready for processing as desired. The offal descending the chute 29 onto a conveyor, not shown, for delivery to the fertilizer machine.

Cooperating with the cutter head are the cam guides 30 fixed upon the main frame and adapted to impinge under the pintles 31 of the links of the conveyor 50. These cam guides beneath cooperate with the horizontal flat depression plate 33, fixed to the main frame by brackets 32 above the guides and adapted to engage the backs of the fish bodies clamped in the conveyor, to prevent the longitudinal withdrawal of the bodies of the fish when the heads are engaged by the cutting disk 10 and the blades 28. To further insure this retention of the fish within the conveyor, the clamping jaws 15 are provided with burrs 34, upset in the body of the metal thereof, to frictionally and positively retain the fish by mechanical engagement therewith. To further insure this action I prefer to form the jaws as shown, of a single strip of spring metal 35, fixed to the conveyor link and having the upwardly extending edges 36, slightly separated at the top, to allow for a resilient pinching action to drive the burrs 34 into the skin of the fish adjacent to the side fins or larger portion of the fish. These clamping jaws will vary with the size and shape of the species of fish being processed through the machine.

In feeding the fish to the conveyor the operator stands at the side of the machine opposite the gage board 17 and lays the fish between the jaws 15, with the heads against the gage board with the fish bellies downward, it is not necessary for the operator to force the fish between the jaws, as they are forced firmly into the conveyor when they pass beneath the upwardly curved end of the depression plate 33, where they remain firmly held until the conveyor passes over the sprockets 12, whereat the jaws automatically open as the links pass around the sprockets, permitting the fish to drop into the chute 37, for delivery to a conveyor, not shown, for transmission to the canning or other processing machinery.

Automatic means for laying the fish into the conveyor will form the subject matter of a further application for patent. Wherehand feeding is used the conveyor can be extended as far as necessary ahead of the cutting mechanisms to insure every conveyor clamp being filled by as many hand feeders as are necessary.

To provide means for transversely dividing the fish bodies before their delivery from this machine, the rotary discs 38—38 are provided upon the shaft 39, mounted upon the main frame and driven by the pulley 40, impinging on the belt 21. These discs operate in slots in the jaws 15, and sever the fish bodies transversely after they have been cleaned and before they are delivered to the chute 37, which may be longitudinally divided to separate the severed portions of the fish according to its commercial or edible values. This second cutting into transverse sections is used more especially in the larger forms of fish such as salmon and the like.

In the larger forms of fish such as salmon, having hard resisting spines, the rotary cutter 10 is advisable. However, in the smaller species, such as sardines and the like, it is possible to sever the head and extract the viscera in a single operation, by means of a rotary cutter head such as the blades 28 modified to suit particular circumstances, as will be obvious to those skilled in this art.

Having thus described this invention what I claim and desire to secure by Letters Patent is:—

1. In a fish cleaning machine, fish cutting means, endless conveying means to move the fish into engagement with said cutting means, clamps on the conveyor to retain the fish thereon, a depression plate having an upwardly curved end positioned above the conveyor, and a second plate having upwardly and inwardly inclined ends positioned between the parallel sides of the conveyor and below the depression plate to move the conveyor upwardly to cause the fish to contact with the depression plate whereby the fish are firmly engaged by said clamps.

2. In a fish cleaning machine, fish cutting means, a conveyor adapted to carry the fish into engagement with the cutting means, clamps on the conveyor to retain the fish thereon, a depression plate having an upwardly curved end positioned above the conveyor, and a second plate positioned beneath the conveyor to support the same and being disposed so as to elevate the conveyor whereby the fish are forced into engagement with the depression plate to firmly retain the fish in the clamps during the cutting operation.

3. A fish cleaning machine, comprising a fish decapitator, a conveyor adapted to move the fish in the path of the decapitator, a depression plate above the conveyor and a second plate positioned beneath the first plate and conveyor and arranged to move the latter upwardly above its normal plane of movement whereby the fish are elevated to engage the depression plate to firmly retain the fish in the path of the decapitator.

4. A fish cleaning machine comprising a decapitator, a conveyor supported adjacent the decapitator, clamping means for retaining the fish upon the conveyor, and a pair of spaced horizontal plates having their forward ends diverging outwardly relative to each other and coacting with said conveyor to hold the fish firmly thereon and in the path of the decapitator.

5. In a fish cleaning machine, a sectional belt conveyor having spring clamps formed with upwardly converging arms mounted upon each of said sections of the belt and adapted to cooperate with the clamp on the adjacent conveyor section to retain a fish thereon.

6. In a fish cleaning machine, cutting means for the fish, a sectional conveyor for the fish, clamps having upwardly converging spring arms on each of said conveyor sections, each of the arms being adapted to cooperate with an arm of the clamp of the adjacent conveyor section, to retain a fish thereon, means to force the fish between said opposed cooperating spring arms, and means to move the conveyor and fish into engagement with the cutting means.

7. A conveyor belt for fish cleaning machines comprising a plurality of sections, substantially triangular-shaped spring members carried by each of the conveyor sections adapted to cooperate with a spring member on the adjacent section for engaging a fish.

8. In an endless horizontal link conveyor for fish cleaning machines, spring arms carried by each of said links and formed to cooperate with the spring arms of the adjacent links to retain a fish therebetween, and means to release the fish when the conveyor moves vertically downwardly.

In testimony whereof, I have hereunto set my hand at San Francisco, California, this 16th day of June, 1924.

BALDWIN VALE.